United States Patent
Tabata

(10) Patent No.: US 6,337,476 B2
(45) Date of Patent: Jan. 8, 2002

(54) IMAGE READING APPARATUS HAVING LIGHT SOURCE ELECTRICALLY AND DIRECTLY CONNECTED TO IMAGE SENSOR BOARD

(75) Inventor: Masami Tabata, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/902,169

(22) Filed: Jul. 11, 2001

Related U.S. Application Data

(62) Division of application No. 09/413,023, filed on Oct. 6, 1999, which is a division of application No. 08/795,636, filed on Feb. 6, 1997, now Pat. No. 6,002,494.

(30) Foreign Application Priority Data

Feb. 9, 1996 (JP) .............................................. 8-24341
Jan. 22, 1997 (JP) ................................................ 9-9384

(51) Int. Cl.[7] .................................................. H04N 1/04
(52) U.S. Cl. ..................... 250/208.1; 358/475; 358/482
(58) Field of Search ...................... 250/208.1, 234–236, 250/239, 216, 227.11, 227.2, 227.29, 227.32; 358/474, 475, 482, 484; 385/415

(56) References Cited

U.S. PATENT DOCUMENTS

| | | | |
|---|---|---|---|
| 4,996,606 A | 2/1991 | Kawai et al. ................ | 358/475 |
| 5,019,897 A | 5/1991 | Shirata et al. .............. | 358/509 |
| 5,270,840 A | 12/1993 | Ogata et al. ................ | 482/482 |
| 5,331,433 A | 7/1994 | Sato .......................... | 358/483 |
| 5,418,384 A | 5/1995 | Yamana et al. ............. | 257/88 |
| 5,434,682 A | 7/1995 | Imamura et al. ........... | 358/483 |
| 5,477,329 A | 12/1995 | Imamura et al. ........... | 358/482 |
| 5,579,114 A | 11/1996 | Imamura et al. ........... | 358/484 |
| 5,780,840 A | 7/1998 | Lee et al. ................... | 358/482 |
| 5,965,870 A | 10/1999 | Tabata ...................... | 250/208.1 |
| 5,986,253 A | 11/1999 | Tabata ...................... | 250/208.1 |
| 6,002,494 A | * 12/1999 | Tabata ........................ | 358/475 |
| 6,081,351 A | 6/2000 | Tabata ........................ | 358/475 |

FOREIGN PATENT DOCUMENTS

| | | | |
|---|---|---|---|
| JP | A-05-130329 | 5/1993 | |
| JP | A-06-3527 | 1/1994 | |
| JP | A-07-170373 | 7/1995 | ............ H04N/1/28 |
| JP | A-07-193675 | 7/1995 | ............ H04N/1/28 |
| JP | A-08-163320 | 6/1996 | |

* cited by examiner

Primary Examiner—Stephone B. Allen
(74) Attorney, Agent, or Firm—Fitzpatrick, Cella, Harper & Scinto

(57) ABSTRACT

An image reading apparatus includes a sensor IC having a group of photoelectric conversion devices which are linearly aligned, a sensor board on which the sensor IC is mounted, a lens for forming light information into an image on the sensor IC, a light source having electrical connection lines, an illumination unit consisting of a light guide for guiding light from the light source and outputting the light in a desired direction, and a frame for holding the respective members. The electrical connection lines of the light source are directly connected to the sensor board. Connector cables for the light source can be omitted, and the image sensor and the external system can be electrically connected through one connector. By simplifying the electrical connection, the influence of noise can be minimized.

16 Claims, 8 Drawing Sheets

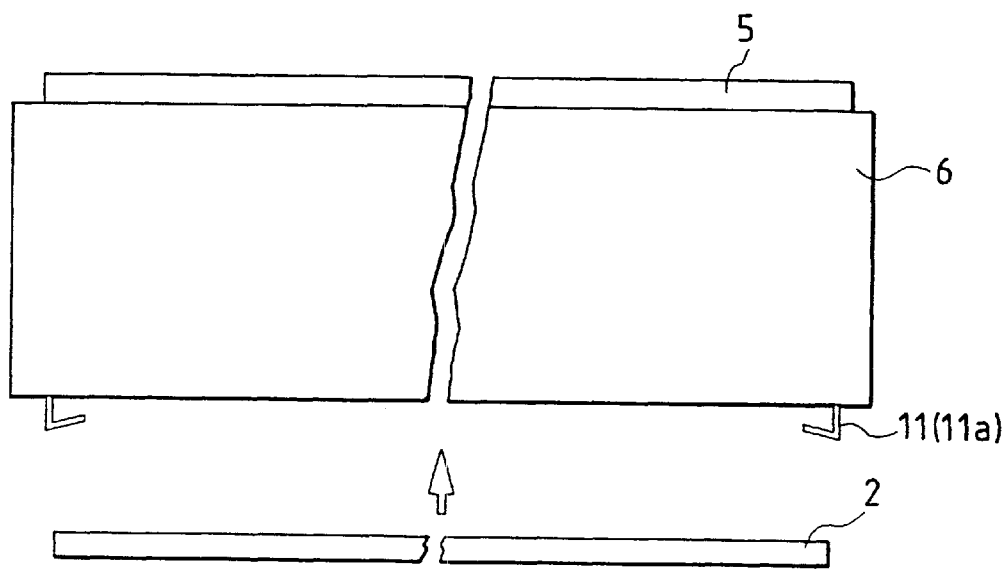
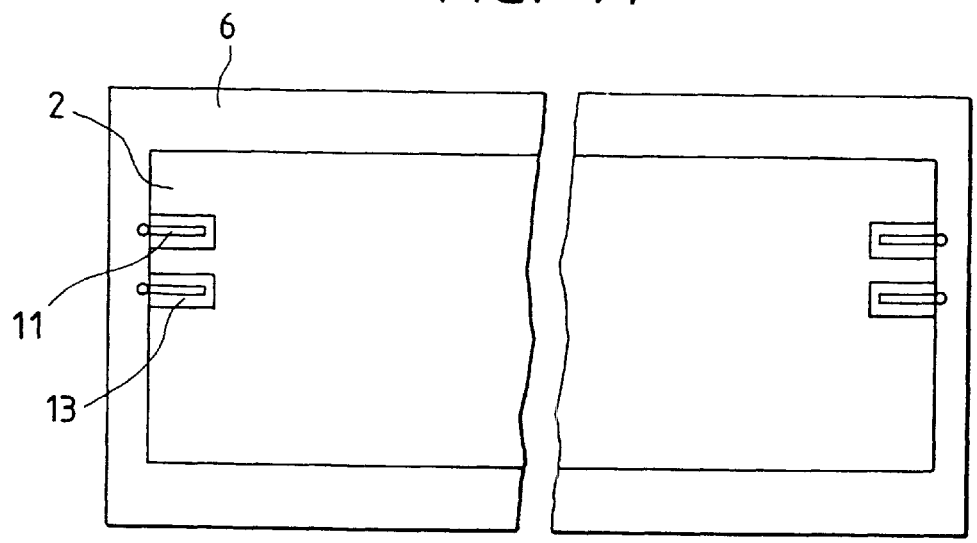

IMAGE READING APPARATUS HAVING LIGHT SOURCE ELECTRICALLY AND DIRECTLY CONNECTED TO IMAGE SENSOR BOARD

This application is a division of application Ser. No. 09/413,023, filed Oct. 6, 1999, which is a division of application Ser. No. 08/795,636, now U.S. Pat. No. 6,002,494, filed Feb. 6, 1997.

BACKGROUND OF THE INVENTION

1. Field of the Invention

The present invention relates to an image reading apparatus such as a scanner or a facsimile apparatus.

2. Related Background Art

As shown in the sectional view of FIG. 1 and the plan view of FIG. 2, an image sensor used in an original reading apparatus comprises a sensor IC 1, a sensor board 2 on which the sensor IC 1 is mounted, a lens array 3, an illumination unit 4, a cover glass 5, and a frame 6 for positioning/holding these members. The illumination unit 4 comprises lead frame type LEDs 7 serving as light sources, a light guide 8, and a housing 9 for positioning/holding the LEDs 7 and the light guide 8.

FIGS. 3A and 3B are sectional and side views, respectively, showing the detailed structure of the illumination unit 4. Referring to FIGS. 3A and 3B, the illumination unit 4 is constituted by the lead frame type LEDs 7 serving as light sources, the columnar light guide 8 consisting of a transparent member of, e.g., an acrylic resin, and the housing 9 which has a hexagonal section to position/hold the LEDs 7 and the light guide 8.

The LEDs 7 are arranged at the two ends of the light guide 8 such that light beams are incident into the light guide 8. The light guide 8 has a diffusion surface 10. Fine tapered portions are continuously formed on the diffusion surface 10 along the longitudinal direction of the light guide 8, as shown in FIG. 4. A light beam incident on this tapered portion at an incident angle θ of 41° or more (when the light guide 8 consists of an acrylic resin and has a refractive index n of 1.5) satisfies the total reflection angle condition so that the light beam emerges in a desired direction.

The housing 9 for positioning/holding the LEDs 7 and the light guide 8 has, on a surface corresponding to one of the six sides of its hexagonal section, a slit 12 for passing light in the exit direction. To ensure a light amount, the light guide 8 preferably has a white-based color with a high light reflection efficiency. The light guide 8 is formed of, e.g., an ABS resin.

The LEDs 7 are electrically connected to an external system through connector cables 16. Since two LEDs sandwich the light guide 8, two connector cables 16 are necessary. Cables 16 are used to connect leads 11 of the LEDs 7 to driving unit 18, which is used to turn the light source on.

In the above prior art, the LEDs 7 are electrically connected to the external system through the connector cables 16. For this reason, the following problems are posed.

(1) The number of connector cables 16, equal the number of LEDs 7. The cost of the connector cables 16 and an increase in labor for attaching the connector cables 16 to leads 11 of the LEDs 7 result in an increase in cost.

(2) Electrical connection between the image sensor and the external system is complex and therefore easily affected by noise.

(3) A predetermined illuminance on the original read line can hardly be obtained because no luminance adjusting circuit for the LEDs 7 can be inserted between the LEDs 7 and the external system. For this reason, a sensor output ("bright" sensor output) in reading, e.g., a white original largely varies between image sensors as end products.

SUMMARY OF THE INVENTION

It is an object of the present invention to enable high-quality image read processing.

It is another object of the present invention to provide an image reading apparatus having a high mechanical strength.

It is still another object of the present invention to achieve cost and size reduction of an image reading apparatus.

It is a further object of the present invention to minimize variations in read outputs.

In order to achieve the above objects, according to an aspect of the present invention, there is provided an image reading apparatus comprising a light source for irradiating a target object, a sensor IC having a photoelectric conversion device for converting light information from the target object irradiated by the light source into an image signal, a sensor board separated from the light source and mounted with the sensor IC, a frame which incorporates the light source, and fixing means for fixing a lead member from the light source to the sensor board and fixing the sensor board to the frame.

With this arrangement, a sufficient mechanical strength can be ensured while achieving size and cost reduction of the apparatus. In addition, variations in read outputs can be suppressed, so that a high-quality image can be read.

Other features, objects and advantages of the present invention will be apparent from the following specification in conjunction with the accompanying drawings.

BRIEF DESCRIPTION OF THE DRAWINGS

FIG. 10 is a side view of an image sensor according to the second embodiment;

FIG. 11 is a bottom view of the image sensor according to the second embodiment;

DETAILED DESCRIPTION OF THE PREFERRED EMBODIMENTS

Image sensors according to preferred embodiments of the present invention will be described below with reference to the accompanying drawings.

Figure 5:
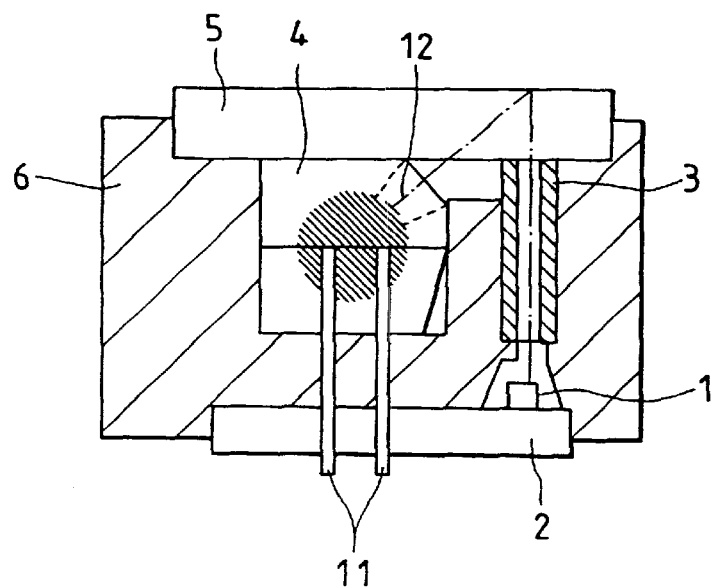
FIG. 5 is a sectional view of an image sensor according to the first embodiment.
Figure 6:
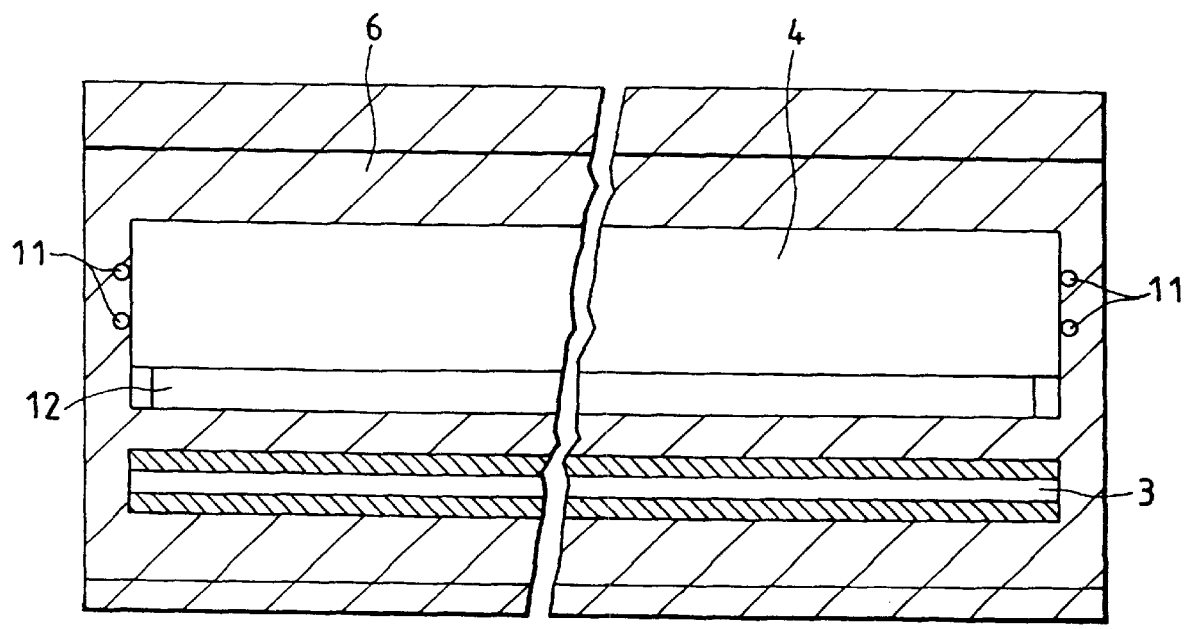
FIG. 6 is a plan view of the image sensor according to the first embodiment.
Figure 7:
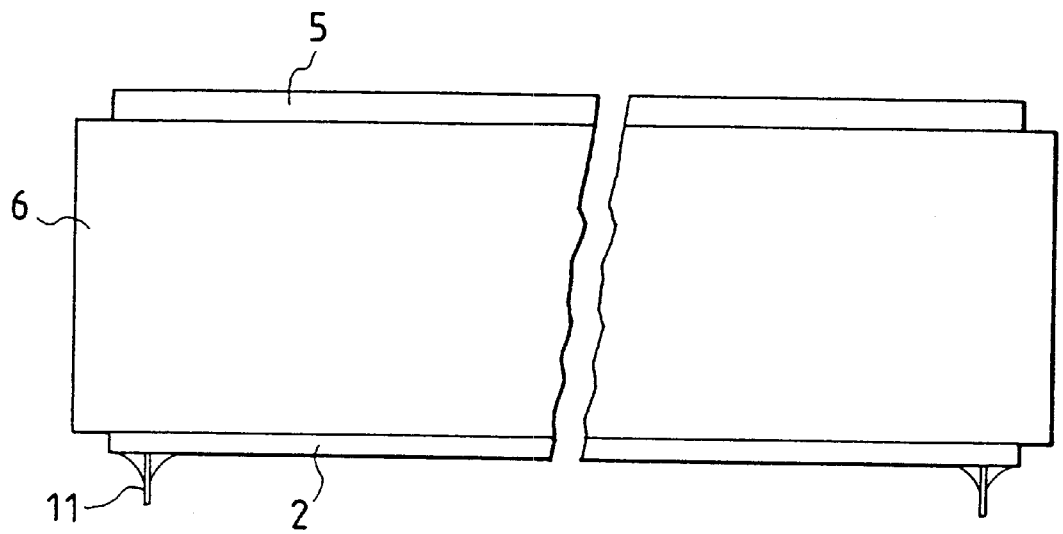
FIG. 7 is a side view of the image sensor according to the first embodiment.

FIGS. 5 to 7 are sectional, plan, and side views, respectively, showing an image sensor according to the first embodiment. This image sensor comprises a sensor array constituted by precisely aligning, on a sensor board 2 consisting of, e.g., a glass epoxy resin, a plurality of sensor ICs 1 having a linear photoelectric conversion device group as a line corresponding to the length of a target read original, a lens array 3, an illumination unit 4, a cover glass 5 consisting of a transparent member for supporting the original, and a frame 6 which is formed of a metal such as aluminum or a resin such as polycarbonate to position/hold these members.

The functions of the respective members will be described. The illumination unit 4 obliquely illuminates an original supported by the cover glass 5, with light at an angle of about 45°. Light information from the original is formed into an image on the sensor IC 1 through the lens array 3. The sensor IC 1 converts the light information into an electric signal and transmits the electric signal to the system.

Figure 1:
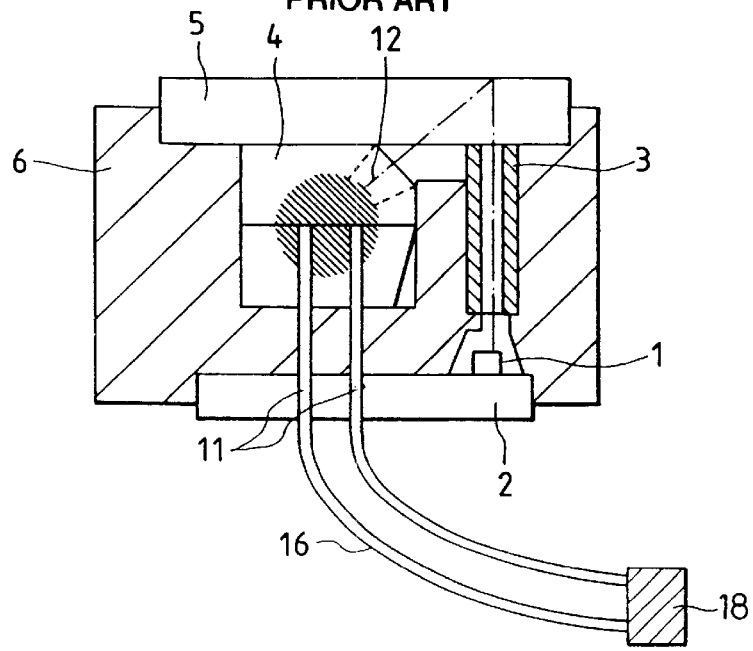
FIG. 1 is a sectional view of an image sensor of a related art.
Figure 2:
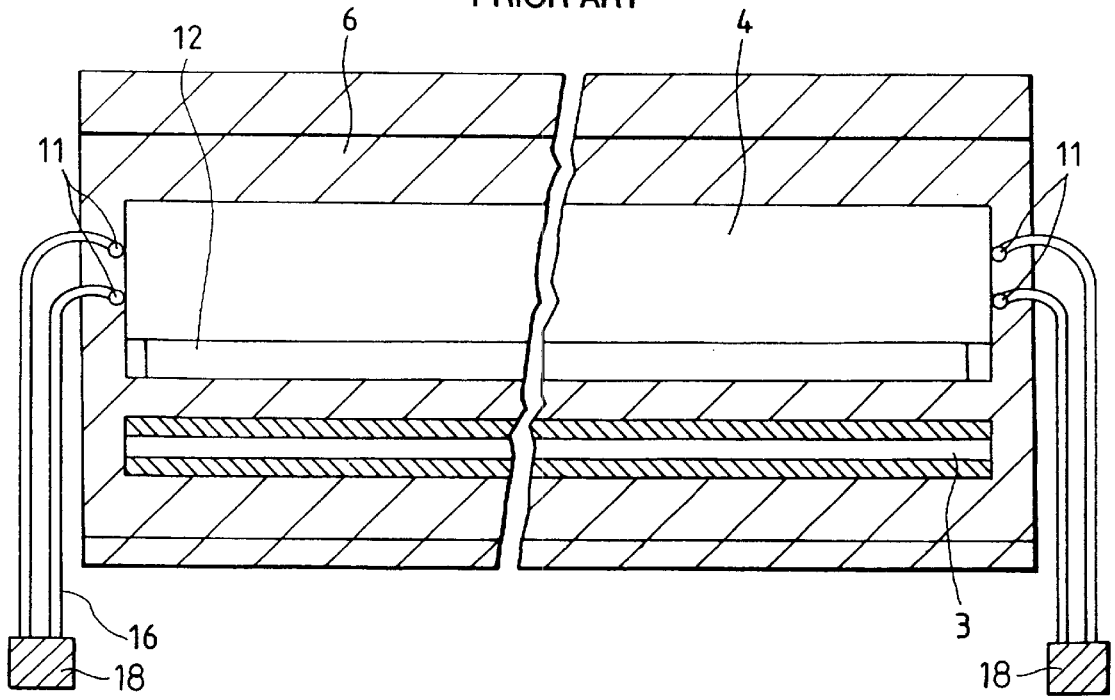
FIG. 2 is a plan view of the image sensor of the related art.
Figure 3A:
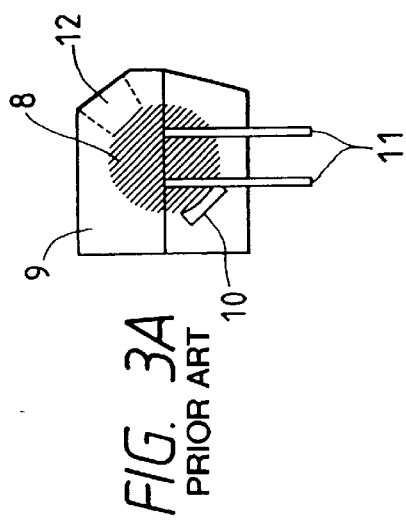
FIGS. 3A and 3B are sectional and side views, respectively, showing an illumination unit of the related art.
Figure 3B:
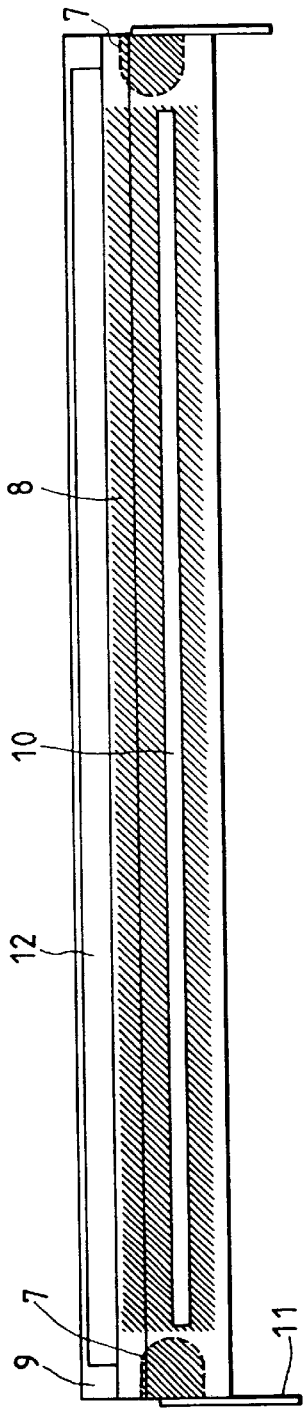
Figure 4:
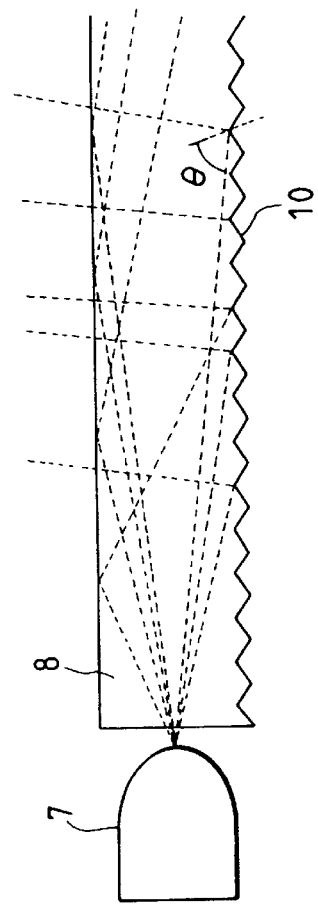
FIG. 4 is a view showing the details of the illumination unit of the related art.

The illumination unit 4 basically has the same arrangement as that shown in FIG. 4. Two leads 11 extend from LEDs 7 arranged at the two ends of the illumination unit 4.

A method of manufacturing the image sensor of the first embodiment will be described next.

The lens array 3 and the illumination unit 4 are inserted to predetermined positions of the frame 6. When three surfaces of a housing 9, which correspond to three of the six sides of the hexagonal section, are caused to abut against the horizontal and vertical surfaces of the frame 6, the optical axis of the illumination unit 4 can be precisely positioned in the rotational direction.

Next, as shown in FIG. 5, the upper surface of the illumination unit 4 and that of the lens array 3, which are inserted into the frame 6, approximately form a plane together with the cover glass 5 mounting portion of the frame 6. The cover glass 5 is placed on this plane and bonded, with, e.g., an adhesive, to two surfaces of the frame 6, which are set to sandwich the illumination unit 4 and the lens array 3 along the longitudinal direction. The upper surface of the illumination unit 4 approximately parallelly contacts the surface of the cover glass 5 because the upper surface of the illumination unit 4 is a horizontal surface. Therefore, by bonding the frame 6 to cover glass 5, as described above, the illumination unit 4 can be simultaneously firmly fixed.

Figure 8:
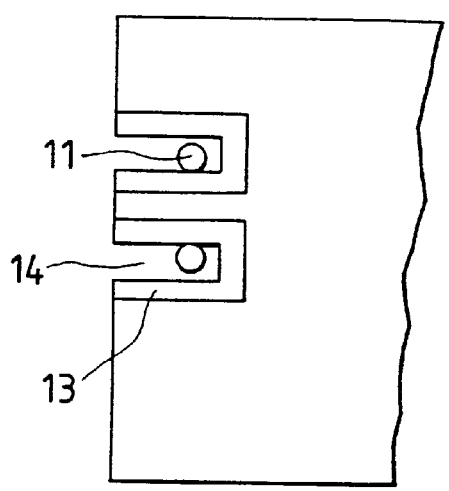
FIG. 8 is a view showing the details of the end portion of a sensor board according to the first embodiment.
Figure 9:
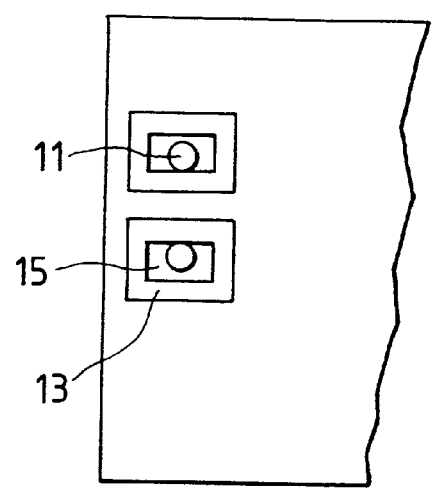
FIG. 9 is a view showing the details of the end portion of the sensor board according to the first embodiment.

The sensor array is inserted into the frame 6. As shown in FIG. 8 or 9, gaps 14 (FIG. 8) or through holes 15 (FIG. 9) are formed in the sensor board 2 of the sensor array at positions or portions corresponding to the leads 11 of the LEDs 7, i.e., at the end portions of the sensor board 2. The leads 11 of the LEDs 7 are bent into an almost L shape and inserted into these gaps 14 or through holes 15. After insertion of the leads 11, the leads 11 are soldered to solder lands 13 formed around the gaps 14 or through holes 15 to fix the sensor board 2 to the frame 6, thereby completing the image sensor.

As shown in FIG. 8 or 9, the gaps 14 or through holes 15 are independently formed in correspondence with the anodes and cathodes of the leads 11 of the LEDs 7. With this arrangement, an electrical short circuit between the leads 11 of the LEDs 7 can be prevented. In addition, when through hole plating is performed for the section of the gap 14 or through hole 15 of the sensor board 2, the soldering strength can be increased.

FIGS. 10 and 11 show an image sensor according to the second embodiment of the present invention.

In this embodiment, leads 11 of LEDs 7 are bent into an almost U shape such that a second bent portion 11a from the LED 7 forms an angle of 90° or less (FIG. 10). Using the leads 11 of the LEDs 7, a sensor board 2 is inserted into a frame 6 in a snap-fitted manner. With this arrangement, the sensor board 2 can be fixed, and at the same time, electrical contact between the leads 11 of the LEDs 7 and the pads of the sensor board 2 can be obtained.

When the contact portions between the leads 11 of the LEDs 7 and the pads of the sensor board 2 are reinforced by, e.g., forming gaps as described above or soldering, fixing of the sensor board 2 and electrical contact between the leads 11 and the pads of the sensor board 2 can be more reliably achieved.

The third embodiment in which the present invention is applied to an image sensor corresponding to color image read processing will be described below. Generally, to read a color image, light sources of three colors, i.e., red (R), green (C), and blue (B) are used to illuminate an original while sequentially turning on these three color light sources. Light information of three colors, i.e., R, G, and B obtained from the original is formed into an image on a sensor IC through a lens array and converted into an electric signal by the sensor IC, thereby obtaining a color image signal.

Figure 12:
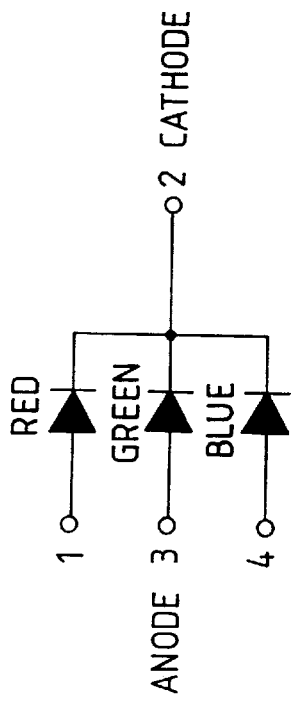
FIG. 12 is an equivalent circuit diagram of an illumination section according to the third embodiment.

FIG. 12 is an equivalent circuit diagram of such a color LED light source. As shown in FIG. 12, the color LED light source is constituted by a common cathode and anodes which are independently arranged in units of LEDs.

Figure 13B:
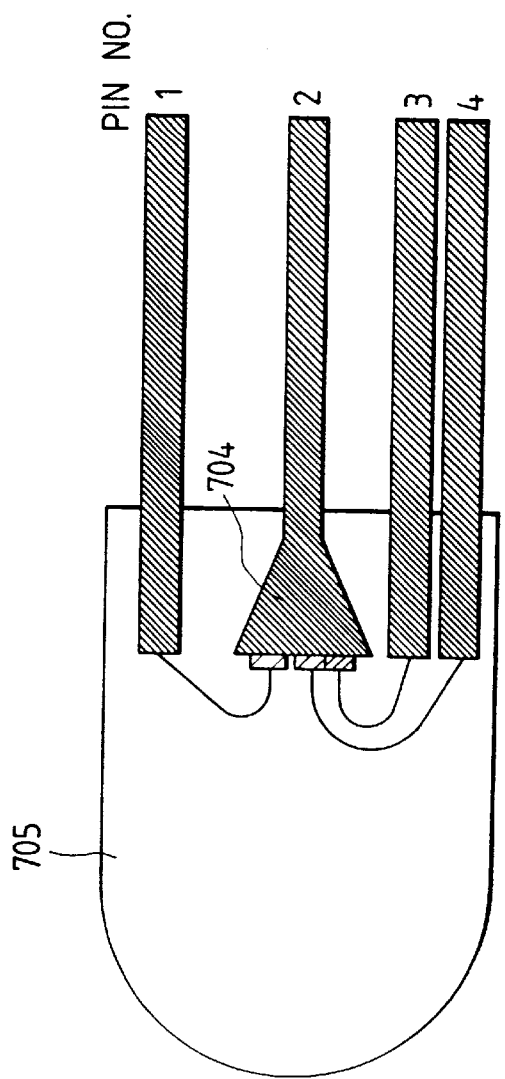
FIGS. 13A and 13B are sectional and side views, respectively, showing the illumination section according to the third embodiment.
Figure 13A:
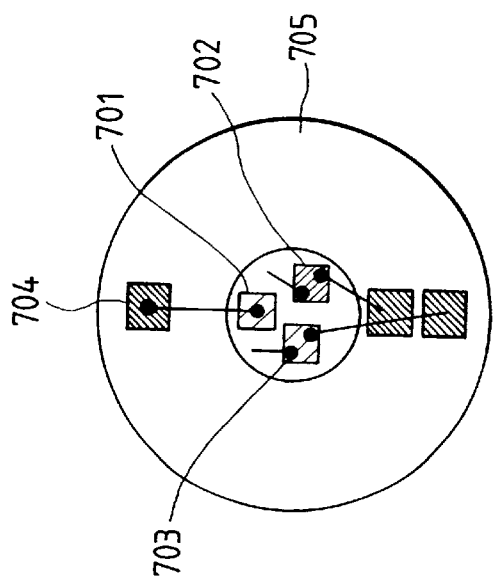

In this embodiment, a light source as shown in FIGS. 13A and 13B is used as a light source for emitting three color, i.e., R, G, and B light components. FIGS. 13A and 13B are sectional and side views, respectively, showing a shell type color LED light source. This LED light source is constituted by an R-LED device 701 for emitting red light, a G-LED device 702 for emitting green light, and a B-LED device 703 for emitting blue light. The cathodes of these three color LED devices are connected to the common base pin of a lead frame 704. The anodes of the LED devices are connected to the pins of the lead frame 704, which are dedicated for the respective colors. This structure is encapsulated with a shell-like transparent resin 705. In this color LED light source, four lead pins 11 of LEDs 7 are directly connected to a sensor board 2 by, e.g., soldering to fix the sensor board 2, as in the above-described monochromatic LED light source. Since the color LED light source has four lead pins, the sensor board 2 can be more reliably positioned and fixed.

Figure 14B:
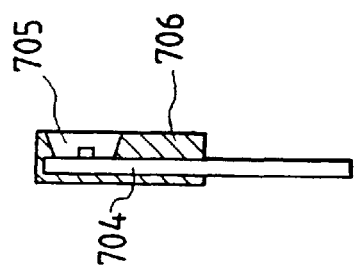
FIGS. 14A and 14B are sectional and side views, respectively, showing an illumination section according to the fourth embodiment.
Figure 14A:
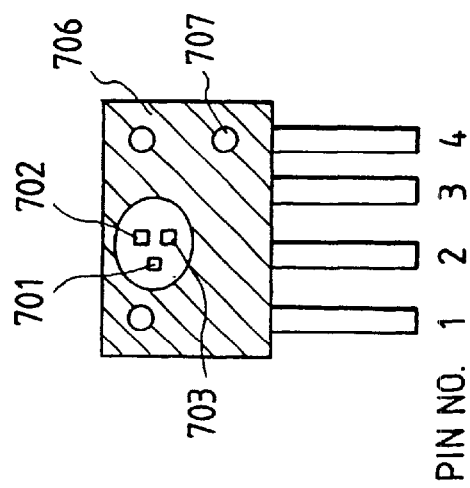

As another color LED light source corresponding to color image read processing, a case-molded LED light source as shown in FIGS. 14A and 14B will be described. FIGS. 14A and 14B are plan and sectional views, respectively, showing the case-molded color LED light source. A method of manufacturing this LED light source will be described. A lead frame 704 is inserted into a mold and then injectionmolded, thereby covering the lead frame 704, except an LED device mounting portion, with a white resin 706 having a high light reflection efficiency. Subsequently, the cathodes of three color LED devices, i.e., an R-LED device 701, a G-LED device 702, and a B-LED device 703 are connected to the common base pin of the lead frame 704, and the anodes of the LED devices are connected to the pins of the lead frame 704, which are dedicated for the respective colors. A transparent resin 705 is potted on the three color LED devices, thereby completing the LED light source.

Figure 15A:
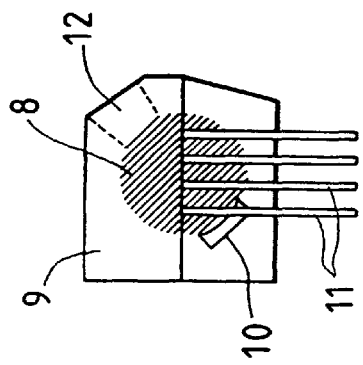
FIGS. 15A and 15B are sectional and side views, respectively, showing an illumination unit according to the fourth embodiment.
Figure 15B:
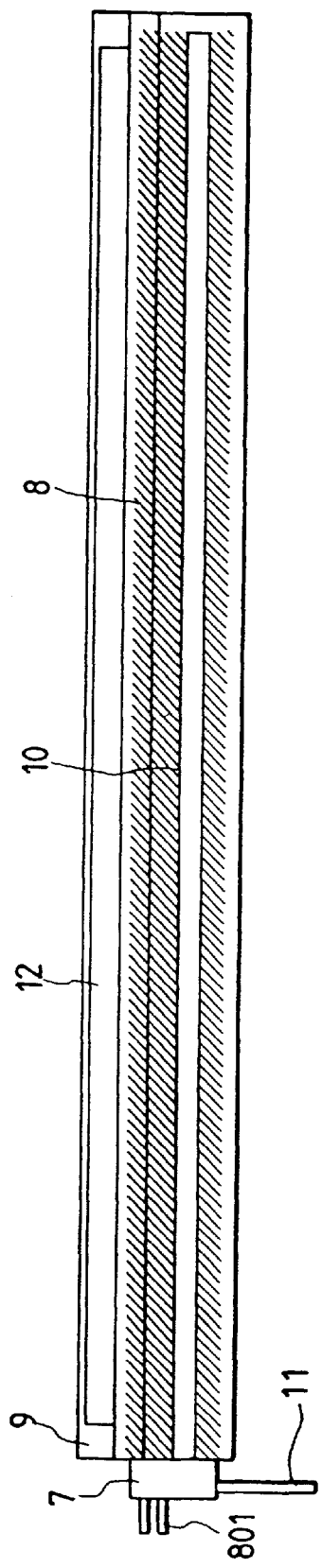
Figure 16A:
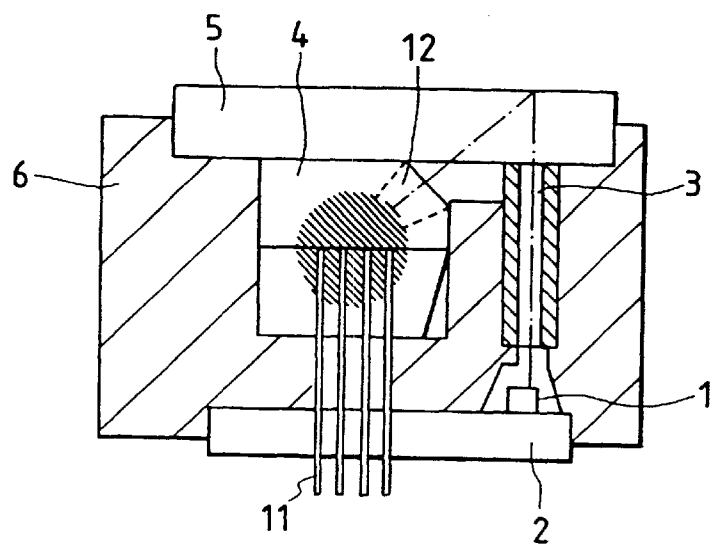
FIGS. 16A and 16B are sectional and side views, respectively, showing an image sensor according to the fourth embodiment.
Figure 16B:
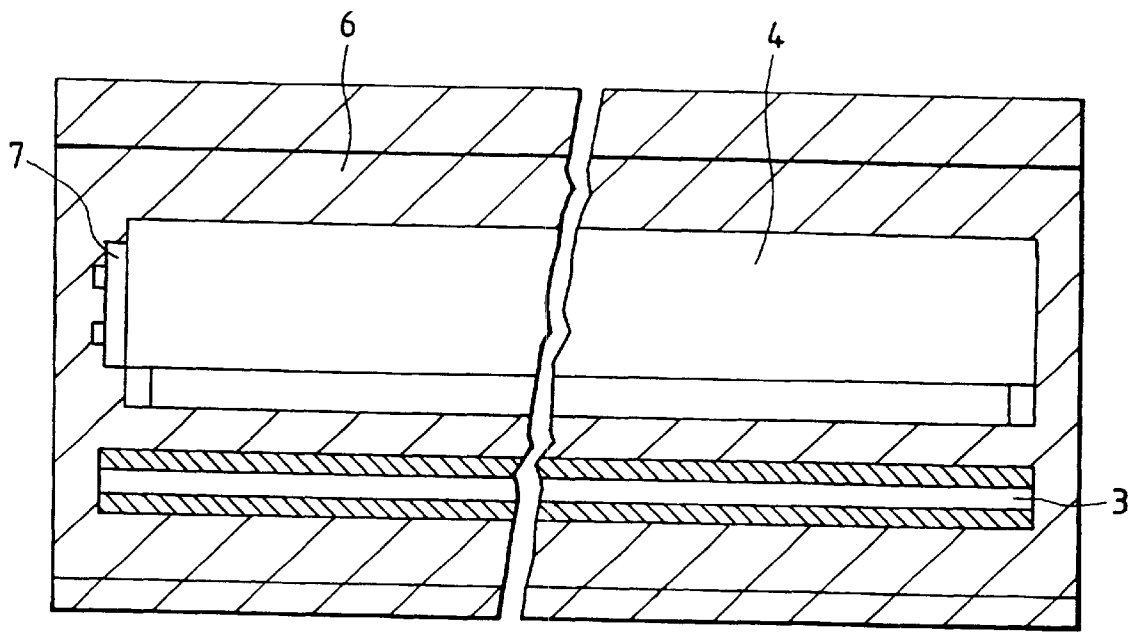

FIGS. 15A and 15B are sectional and side views, respectively, showing an illumination unit 4 to which the case-molded color LED light source is attached. FIGS. 16A and 16B are sectional and side views, respectively, showing an image sensor in which this illumination unit is mounted. The arrangement is basically the same as that using the shell type LED light source. In this case, however, positioning pins 801 are inserted into positioning holes 707 of a light guide 8 and thermally or ultrasonically caulked. With this arrangement, the light source can be properly positioned and fixed. In addition, by directly connecting four lead pins 11 of LEDs 7 to a sensor board 2 by, e.g., soldering, the sensor board 2 can be reliably fixed.

In each of the above embodiments, the present invention can be effectively applied to an image sensor using a reduction lens system.

As has been described above, the following effects can particularly be obtained by directly connecting the electrical connection lines of the light source to the sensor board:

(1) The connector cables for the light source can be omitted, and the image sensor and the external system can be electrically connected through one connector. By simplifying the electrical connection, the influence of noise can be minimized.

(2) A luminance adjusting circuit for the light source is arranged on the sensor board. With this arrangement, variations in sensor outputs ("bright" sensor outputs) in reading a white original can be effectively suppressed.

(3) By bending the electrical connection lines of the light source into an almost U shape, the sensor board can be fixed, and at the same time, electrical contact between the leads of the LEDs and the pads of the sensor board can be obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:

(a) a light source unit adapted to irradiate a target object placed on a flat plate, said light source unit having an LED unit that has at least one LED and at least one lead member, and a longitudinal light guide that has a longitudinal end attached to said LED unit;

(b) a longitudinal frame having a hole adapted to receive said lead member of the LED unit therethrough, and to couple to said light source unit, wherein the hole is located at a longitudinal end of said longitudinal frame;

(c) a sensor board adapted to receive said lead member of the LED unit, said lead member being soldered to said sensor board, thereby coupling said sensor board to said longitudinal frame;

(d) a line sensor for converting light information from the target object irradiated by said light source unit into an image signal, wherein said line sensor is coupled onto said sensor board; and (e) a control circuit adapted to turn on at least one LED of the LED unit at a predetermined time.

2. An apparatus according to claim 1, wherein said sensor board has a gap capable of receiving said lead member.

3. An apparatus according to claim 1, wherein said sensor board has a through-hole capable of receiving said lead member.

4. An apparatus according to claim 1, further comprising a lens placed to form, on said line sensor, an image of the light information from the target object irradiated by said light source unit.

5. An apparatus according to claim 1, wherein said light guide further comprises a reflection member positioned to reflect the light guided by said light guide in a predetermined direction.

6. An apparatus according to claim 1, further comprising a housing that covers said light guide, said housing being white and including an opening to illuminate the target object.

7. An apparatus according to claim 1, wherein the LED unit is passivated with a light-transmissive resin.

8. An apparatus according to claim 1, wherein the LED unit further comprises a white resin.

9. An apparatus according to claim 1, wherein the LED unit includes three positioning holes for positioning the LED unit relative to said light guide.

10. An apparatus according to claim 1, wherein said sensor board is detached from said light source unit.

11. An apparatus according to claim 1, wherein said LED unit has a plurality of lead members extending from the LED unit, and wherein all said lead members are soldered to said sensor board.

12. An apparatus according to claim 11, wherein the LED unit has a plurality of LEDs, said LEDs each having a different respective emission wavelength.

13. An apparatus according to claim 1, wherein the LED unit has a plurality of lead members, said plurality of lead members being arranged substantially parallel to each other.

14. An apparatus according to claim 13, wherein the LED unit has four lead members.

15. An apparatus according to claim 14, wherein the four lead members include a common cathode and three anodes.

16. An apparatus according to claim 15, wherein LEDs and the lead members are electrically connected to each other by a wire.

* * * * *

UNITED STATES PATENT AND TRADEMARK OFFICE
CERTIFICATE OF CORRECTION

PATENT NO.   : 6,337,476 B2
DATED         : January 8, 2002
INVENTOR(S)  : Masami Tabata It is certified that error appears in the above-identified patent and that said Letters Patent is hereby corrected as shown below:

Column 6,
Line 55, "LEDs" should read -- the LEDs --.

Signed and Sealed this

Eleventh Day of June, 2002

Attest:

Attesting Officer

JAMES E. ROGAN
Director of the United States Patent and Trademark Office